United States Patent [19]

Sugiura

[11] Patent Number: 4,527,512

[45] Date of Patent: Jul. 9, 1985

[54] COLLAPSIBLE ANIMAL CAGE

[75] Inventor: Masami Sugiura, Funi, Japan

[73] Assignee: Tokyo Petcage Co., Ltd., Tokyo, Japan

[21] Appl. No.: 547,970

[22] Filed: Nov. 2, 1983

Related U.S. Application Data

[63] Continuation-in-part of Ser. No. 381,935, May 26, 1982, abandoned, which is a continuation-in-part of Ser. No. 285,282, Jul. 20, 1981, , which is a continuation of Ser. No. 94,445, Nov. 15, 1979, abandoned.

[51] Int. Cl.³ .............................................. A01K 1/00
[52] U.S. Cl. ....................................................... 119/19
[58] Field of Search ....................... 119/17, 19, 18, 15; 220/4, 6, 7

[56] References Cited

U.S. PATENT DOCUMENTS 1,040,489 10/1912 Baker .................................... 119/19
3,048,147 8/1962 McKean ................................ 119/19
3,324,831 6/1967 St. Onge ............................... 119/19

Primary Examiner—Jay N. Eskovitz
Attorney, Agent, or Firm—Zarley, McKee, Thomte, Voorhees & Sease

[57] ABSTRACT

A collapsible animal cage wherein a cover frame includes two pairs of pivot projections, each pair of which extend downwards at different distances from sides of each end. A pair of side plates, one of which is higher than the other, upper parts of them are pivotally mounted to the pivot projections of the cover frame. Upper parts of a pair of end plates are also pivotally mounted to the cover frame and lower parts of the end plates are fixed to the side plates and are detachable therefrom. A bottom plate is inserted into bottom grooves formed in the lower ends of the side plates. A carry handle may be attached to one of the side parts of the cover frame.

1 Claim, 15 Drawing Figures

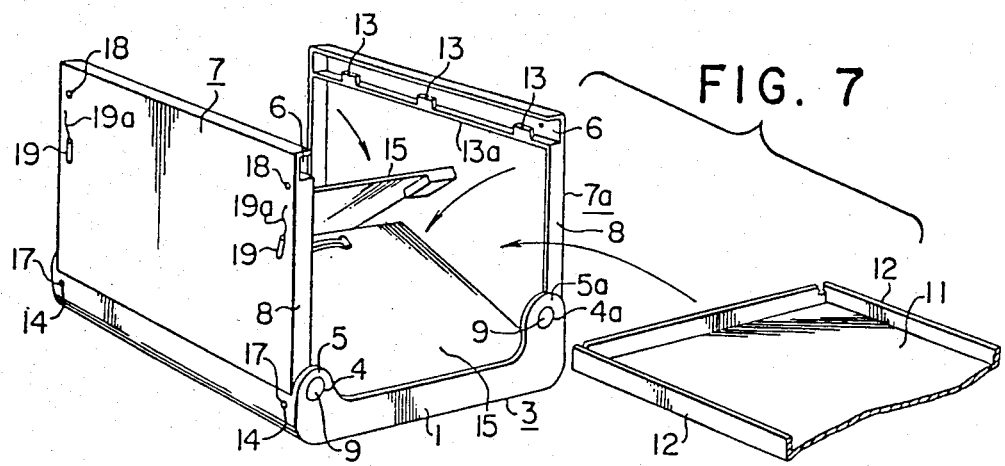
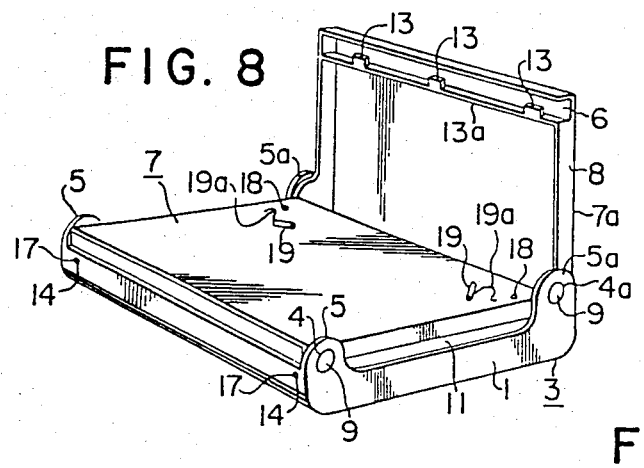
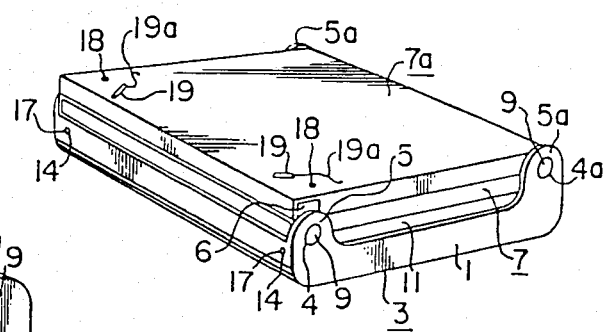
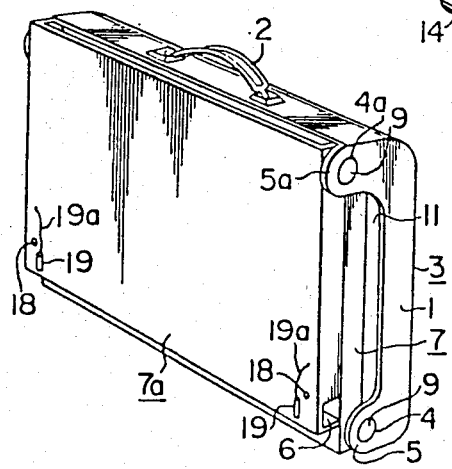

COLLAPSIBLE ANIMAL CAGE

This application is a continuation-in-part of now abandoned application Ser. No. 381,935, filed May 26, 1982, which was a continuation-in-part of co-pending application Ser. No. 285,282 filed July 20, 1981, which is a continuation of application Ser. No. 94,445, filed Nov. 15, 1979, now abandoned.

BACKGROUND OF THE INVENTION

This invention relates to a collapsible cage for animals such as dogs, cats, chickens, birds, and the like.

A conventional cage made of metallic net is rather heavy to handle, and a work that takes plenty of time is required for making it. A pet animal kept in such a conventional cage in the house often scatters hairs fell off the body and a bad smell, and the sanitary conditions is not good. Further, the animal in the conventional cage is sometimes disturbed by surroundings and cannot feel peace or calmness of mind.

SUMMARY OF THE INVENTION

Therefore, it is an object of the present invention to provide a collapsible animal cage free from the aforementioned disadvantages, which is compact and reliable.

According to the present invention there is provided a collapsible animal cage comprising: a cover frame having two pairs of pivot projections, each pair of which extend downwards at different distances from both sides of each end, the two lower pivot projections being positioned in one side of the cover frame and the two higher pivot projections in the other side; a pair of side plates, one of which is higher than the other, each having a bottom groove in its lower end, the upper parts of the higher and the lower side plates being pivotally mounted to the lower and the higher pivot projections of the cover frame; a pair of end plates whose upper parts are pivotally mounted to the end portions of the cover frame and whose lower parts are fixed to the side plates and are detachable therefrom; and a bottom plate which is slidably inserted in the bottom grooves of the side plates.

BRIEF DESCRIPTION OF THE DRAWINGS

Other and more specific objects, features and advantages of the present invention will appear from the following detailed description of a preferred embodiment thereof with reference to the accompanying drawings, in which:

FIG. 7 is a schematic view of a cage of the present invention for explaining its folding method;

FIG. 8 is a schematic view of a cage of the present invention for explaining its folding method;

FIG. 9 is a schematic view of a cage of the present invention, completely folded;

FIG. 10 is a perspective view of a collapsible animal cage of the present invention, which is carried by holding a handle;

DESCRIPTION OF THE PREFERRED EMBODIMENT

Figure 1:
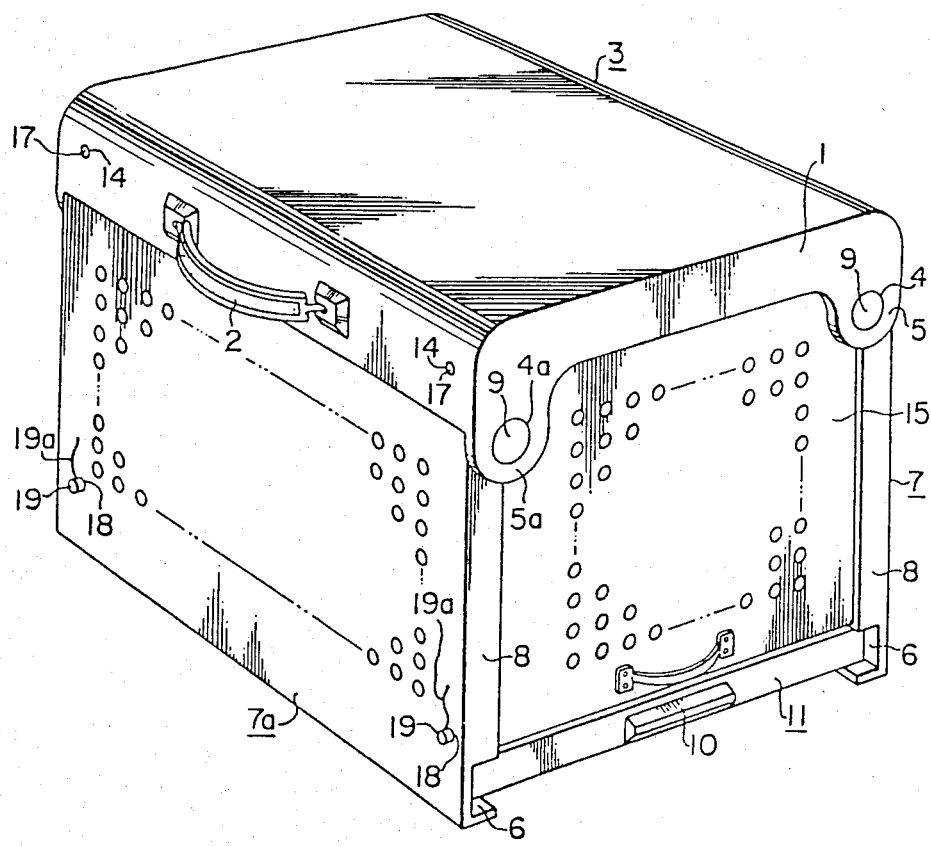
FIG. 1 is a perspective view of a collapsible animal cage according to the present invention.

Referring to the drawings there is shown a collapsible animal cage according to the present invention.

A cover frame 3 includes a pair of front and rear end parts 1 extending downwards, a carry handle 2 mounted to one of side parts extending downwards, and two pairs of pivot projections 5, 5a having pivot holes 4, 4a in their centers, the pair of which project integrally downwards at different distances from the lower side ends of the front or the rear end part 1, i.e., in the case of FIG. 1, the left pivot hole 4a and the left projection 5a are positioned lower than the right pivot hole 4 and the right projection 5, respectively.

Figure 6:
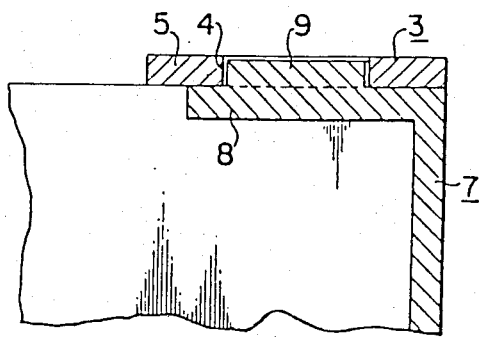
FIG. 6 is a fragmentary longitudinal cross-section, taken along the line VI—VI in FIG. 3.

A pair of side plates 7, 7a generally having small openings for ventilation, the plate 7 being longer than the plate 7a in the longitudinal direction in FIG. 1, each side plate is provided with a bottom groove 6 in the lower end, a pair of side projections 8 which extend towards the other one perpendicular to the side plate 7 or 7a, and a pair of pivot shafts 9 mounted to the top of the side projections 8. The side plates 7, 7a are pivotally mounted to the cover frame 3 by inserting the pivot shafts 9 in the pivot holes 4, 4a, as clearly shown in FIG. 6. The length of the longer side plate 7 in the longitudinal direction is restricted so that the plate 7 may be folded inside safely without contacting with the other side plate 7a, as hereinafter described.

Figure 2:
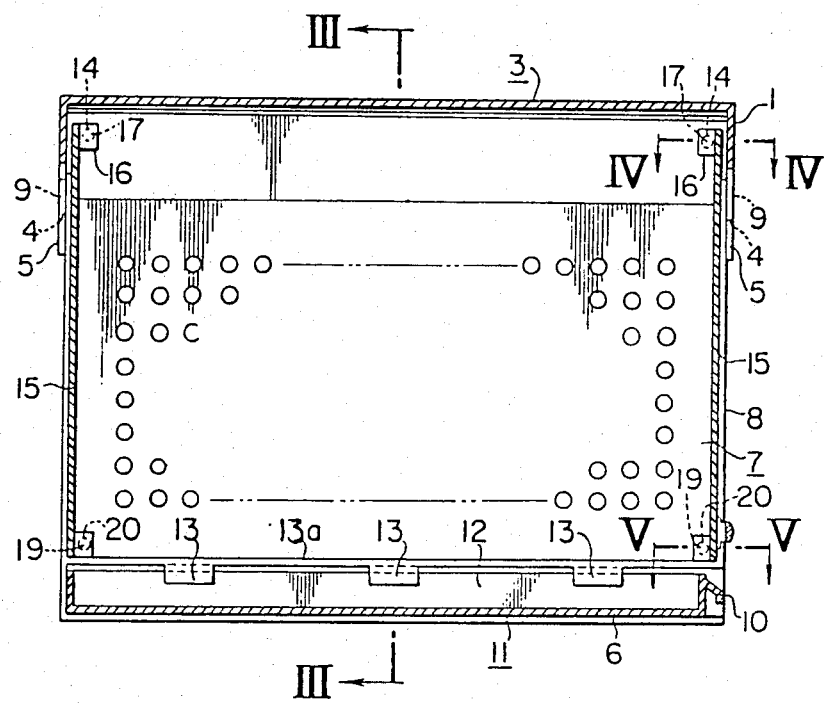
FIG. 2 is a central longitudinal cross-section in FIG. 1.
Figure 3:
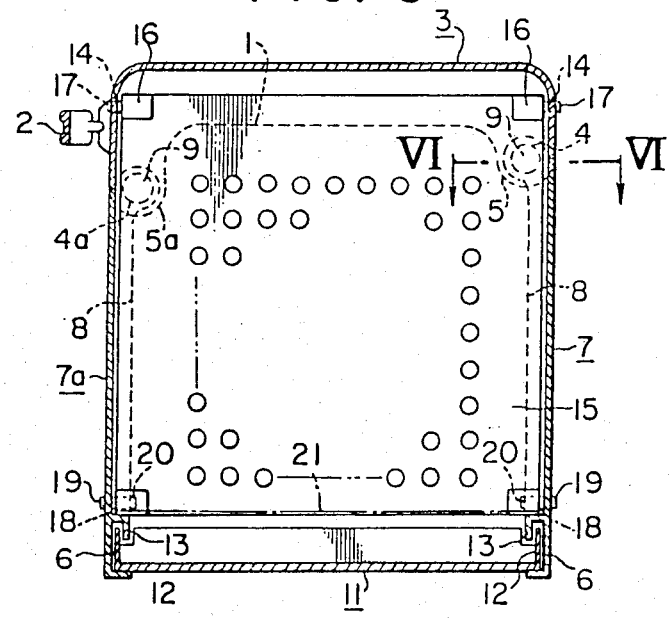
FIG. 3 is a longitudinal cross-section, taking along the line III—III in FIG. 2.

A bottom plate or dish 11 having a handle 10 in its front end is inserted in the bottom grooves 5. Inside side walls 12 of the bottom dish 11 several stop pieces 13 for preventing the bottom dish 11 from moving in the side directions extend downwards from a free end of a horizontal lower step 13a mounted to the lower inner surface of the side plate 7 or 7a, as clearly shown in FIGS. 2 and 3. Hence the side plates 7, 7a may not be opened outerwards while the bottom dish 11 is fitted in the bottom grooves 6 of the side plates.

Figure 4:
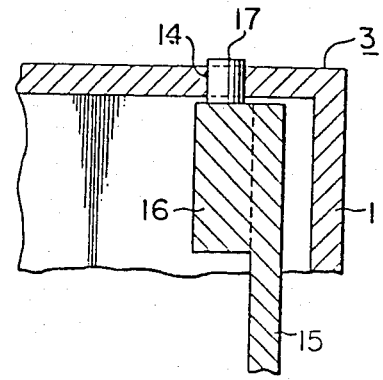
FIG. 4 is a fragmentary longitudinal cross-section, taken along the line IV—IV in FIG. 2.
Figure 5:
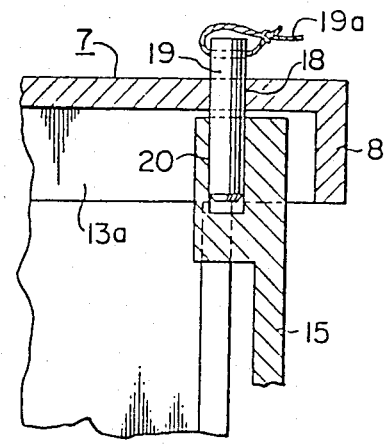
FIG. 5 is a fragmentary longitudinal cross-section, taken along the line V—V in FIG. 2.

A pair of front and rear end plates 15 generally having small openings for ventilation are pivotally mounted to the cover frame 3 by fitting pairs of pivot shafts 17 in upper side holes 14 formed in the front and rear portions of the side parts of the cover frame 3, the pivot shafts 17 extending outwards from brackets 16 mounted to the top side ends of the plates 15, as clearly shown in FIG. 4. The lower free end of the front or rear end plate 15 is fixed by inserting pins 19 which are attached to the lower outer surface of the side plate 7 or 7a by strings 19a, into stop holes 20 formed at the lower side end of the front or rear end plate 15 through lower side holes 18 formed in the lower portion of the side plate 7 or 7a. The lower ends of the plates 15 extend slightly above the top end of the bottom dish 11 so as not to contact therewith. The front plate 15 may be provided with a handle for opening and closing, as shown in FIG. 1. One of or both the front and rear end plates 15 may be made of a metallic net. A net plate or a hurdle 21 may be laid between the lower steps 13a of the side plates 7, 7a, as shown by a imaginary line in FIG. 3.

The cover frame 3, the side plates 7, 7a, the front and rear end plate 15, and the bottom dish 11 are preferably molded in a plastic material, which are light and convenient for handling.

An animal is put into the cage of the present invention from the front or rear end plate 15 by pivoting upwards after pulling out the pins 19 from the stop holes 20 of the plates 15 through the lower holes 18 of the side plates 7, 7a. Thereafter, the pins 19 are again engaged with the stop holes 20 of the plates 15. A door may be provided with the front or the rear end plate 15.

When the cage is not used or the empty cage is transferred, it is preferably folded. In FIGS. 7-9, there is shown a folding method of the cage of the present invention.

First, the cage is turned upside down, and the bottom dish 11 is pulled out of the bottom grooves 6 and is put in the upset cage. Then, the pins 19 are released from the stop holes 20 of the front and rear end plates 15 via the lower side holes 18, and the plates 15 are turned down inside, as shown in FIG. 7. The side plate 7 of which the length in the longitudinal direction is longer than the other side plate 7a, is first turned down inside, as shown in FIG. 8, and the other plate 7 is then turned down inside, as shown in FIG. 9. Thus the folded cage shown in FIG. 10 is carried by holding the handle 2. The folded cage is assembled again in the reverse order of the steps described above.

Hereinafter, referring to FIGS. 11 to 15, another embodiment according to the present invention will be described. In those figures those same members and parts which are also having been in FIGS. 1 to 10 are designated the same reference members and explanations therefor are omitted.

Figure 11:
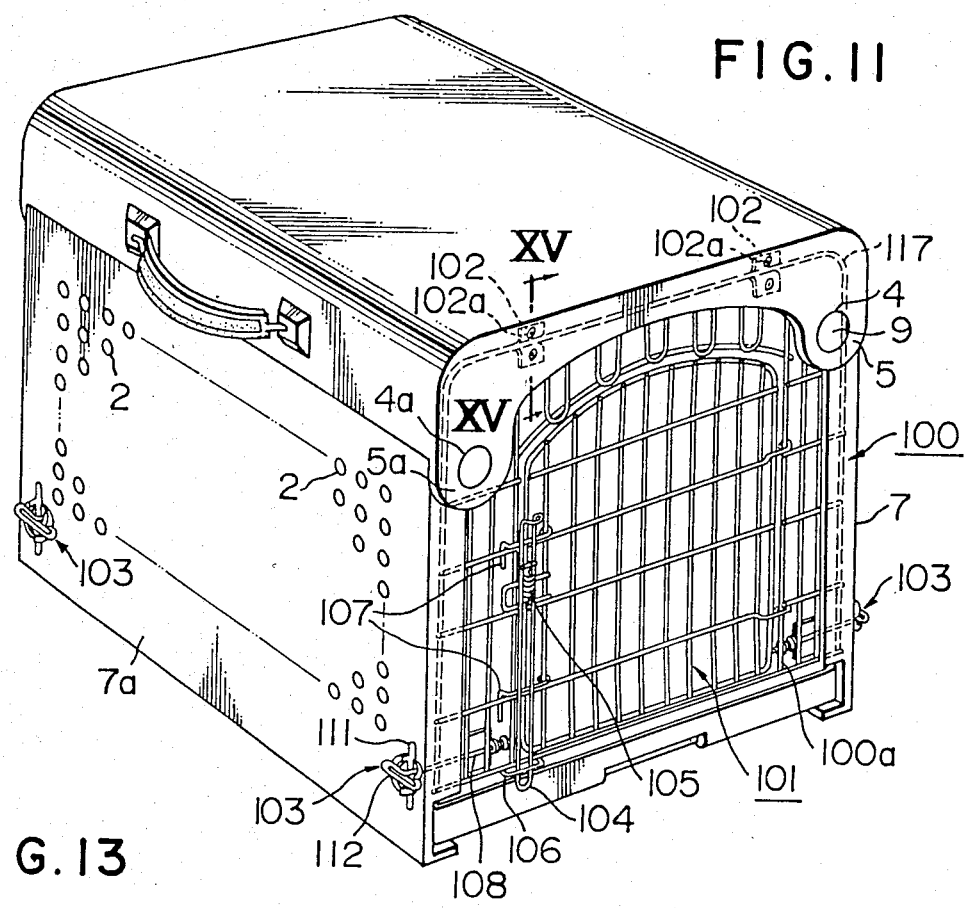
FIG. 11 is a perspective view of other embodiment of the present invention.
Figure 13:
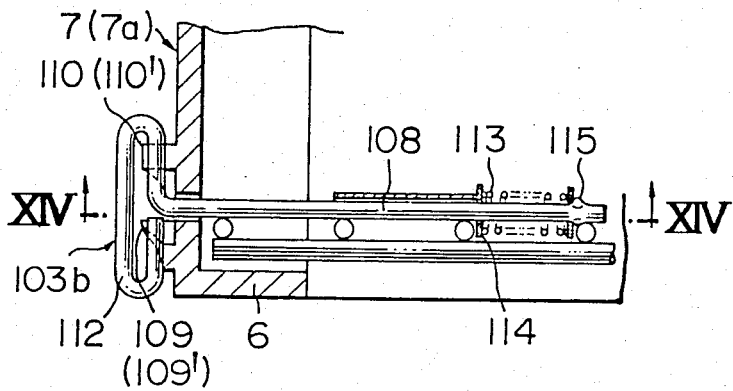
FIG. 13 is a sectional view cut along XIII—XIII line in FIG. 12.

In FIG. 11 there is shown the outline of another embodiment according to the present invention perspectively: In this embodiment instead of the front end plate (rear end plate [15]) a metallic frame (100) composed of rigid and proper thickened metallic rods is disposed, and in the front end plate there is provided a latticed door (101) made of metallic rods of the same kinds of similar metallic material so as to be opened freely. The latticed door (101) is hingedly attached to the edge of said metallic frame (100).

Figure 15:
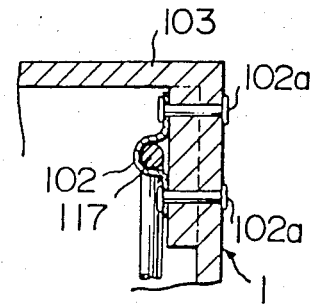
FIG. 15 is a partially omitted sectional view cut along XV—XV line of FIG. 11.

The metallic frame (100) is pivotally fitted on the front end part (1) at its upper end by guide members (102) (which are shown in FIG. 15 and with dotted line in FIG. 11), so that in the case of the pet cage being folded, the metallic frame (100) can be folded with the cover frame (3). The lower edge portion of the metallic frame (100) is adapted to be fixed between the side plates (7 and 7a) by an assembly means (103). The same is done at the rear end frame, so that further explanation is omitted.

One edge portion of each of several metallic rods composing of a part of the latticed door (101) is pivotally secured to a rod which is situated at the innermost of the metallic frame (100) at several positions on the rod. In addition the latticed door (101) is provided with a locking rod (104) having a spring (105) which always energizes the rod (104) downwardly at the opposite side end (left side in FIG. 11) of the side end at which the latticed door (101) being secured to the rod of the metallic frame (100). Normally, the locking rod (104) remains in a locking state by entering in a receiving member (106) for the locking rod (104). The receiving member (106) is disposed at the left lower edge portion (in FIG. 11) of the metallic frame (100) by elastic force of the spring (105). Several reinforcing members (107) may be disposed at appropriate portions of the latticed door (101). The latticed door (101) can be opened by pulling up the locking rod (104) to go out of the receiving member (106).

Figure 12:
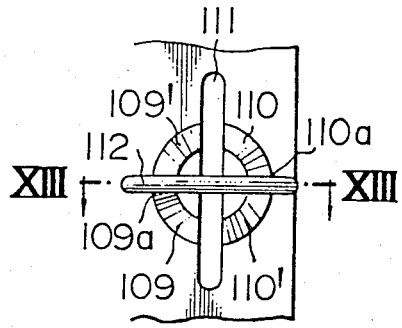
FIG. 12 is an enlarged scale front view of other embodiment of the assembly means for assembling a front end lattice (rear and lattice) and a side plate shown in FIG. 11.

Next, descriptions for another embodiment of the assembly means shown in FIGS. 1 to 5 (which composes of pin holes (18), pins (19), strings (19a) and stops holes (20)) will be continued hereinafter by referring FIGS. 11 to 14. FIG. 12 is a plan view of the embodiment of another assembly means (103). This assembly means (103) serves quite same hole as that of the assembly means, and comprises a circular cam means (103a) disposed at the lower portion of the side plate (7.7a) (at the positions of the pin hole (18) and the stop hole (20) shown in FIG. 1), a long hole (through hole) (111) extending to the outside of the diameter (passing through the center of said circular cam means (103a) by nearly equally cutting it and having proper width sufficient for a knob (112) of a rod member (108) (hereinafter will be deserved) capable of freely passing therethrough, and a stopping rod means (103b). The long hole (111) penetrates the side plate (7.7a). (refer to FIG. 13 and FIG. 14). Said circular cam means (103a) is a short cylinderical shaped projection which extends approximately perpendicularly with respect to the surface of the side plate (7.7a), and is nearly equally divided into two parts by the long hole (111). Each of the two parts of the circular cam means (103a) composes two quadrants (in case of being seen in the direction perpendicular to the surface of the side plate (7) or (7a)) each has a peripheral wall piece (109, 109', 110, 110') respectively. Each of these peripheral side walls forms a smooth climbing slope clockwisely with respect to the surface of the side plate (7, 7a), and at the right end (that is, at the highest portion) one of them couples with the lowest portion (the left end) of the adjoint one in steep slope, so as to speak, nearly perpendicularly. That is a fall (109a) between the right end portion of the peripheral wall piece (109') and the left end portion of the peripheral wall piece (109) is formed, and between the right end part - of the peripheral wall piece (110') and the left end portion of the peripheral wall piece (110) there is also formed a fall (110a). These two falls (109a) and (110a) are arranged perpendicularly with the long hole (111). The stopping rod means (103b) is a rigid metallic rod (108) having the knob (112) whose shape is somewhat resembled to a deformed O ring at one end and at the other end it is provided with a swollen portion (115) which serves as a stopper. The knob (112) must be adapted with the size which can freely pass through the long hole (111), if it aligned with the long hole (111) and larger than that of the diameter of the circular cam means (103a).

The metallic rod (108) is pivotally fixed to the front metallic frame (100) by a guide member (116) so as to be able to slide in the longitudinal direction. Between the swollen portion (115) and the guide member (116), there is provided a coil spring (113) through rigid and smooth washers (114). The coil spring (113) is always energized to pull the rod (108) in the inside direction (right direction in FIGS. 13 and 14). Accordingly, the metallic rod (108) slides within the range of the area shown by a dotted line in FIG. 14.

FIG. 15 is a partically omitted sectional view cut along XV—XV line in FIG. 11, and shows that a frame rod (117) of the outermost side portion of the front metallic frame (100) is fixed to the front end part (rear end part) (1) with the guide member (102) and a clamping means (102a).

Figure 14:
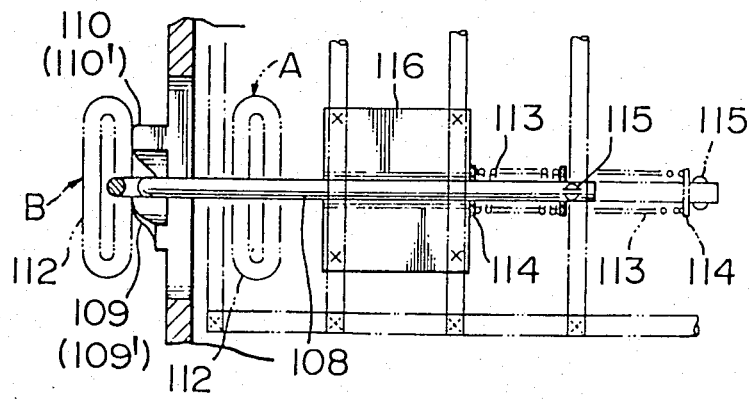
FIG. 14 is a sectional view cut along XIV—XIV line in FIG. 13.

Hereinafter, assembling the cage by this embodiment will be explained. The stopping rod means (103b) of the assembly means (103) is, when the case is in folded state, situated as shown in a dotted line A by elastic force of the coil spring (113). Accordingly, when one wishes to assemble the cage, pull the knob (112) outwardly (in the longitudinal direction) so as to pass through until it projects from the long hole (111), and then twist is clockwisely till the knob (112) comes to fall into the falls (109a) and (110a) a state shown by a dotted line B in FIG. 14 is a fully pulled out state. Thus, when an angle between the knob (112) and the long hole (111) comes to approximately 90°, by elastic force of the spring (113) the knob (112) falls in the falls (109a) and (110a), and the side plate (7) and the front metallic frame (100) is assembled. This is quite same as other side (7a) of the front metallic frame (100) and the both ends of the rear metallic frame. Thus, according to this embodiment the cage can be quite easily assembled and folded to be carried. In this embodiment it is designed that the came means (103a) may be molded integrally with the side plate.

Although the present invention has been described with reference to a preferred embodiment thereof, various changes and modifications can be made by those skilled in the art without departing from the scope of the present invention.

I claim:

1. A collapsible animal cage comprising:

a cover frame having two pairs of pivot projections, each pair of which extends downwards at different distances from both sides of each end, the two lower pivot projections being positioned in one side of the cover frame and the two higher pivot projections in the other side;

a pair of side plates, one of which is higher than the other, each having a bottom groove in its lower end, each groove having an upper and lower step and the upper parts of the higher and lower side plates being pivotally mounted to the lower and the higher pivot projections of the cover frame, and said side plates being adapted to contact and lie flush with said cover frame when pivoted to a vertical, open position during assembly;

two pairs of assembly means each comprising of a circular cam means provided at the lower portion of the side plate, a long hole which is bored, penetrating the surface of the side plate, in the center of said circular cam means and extending straightly so as to have larger size than that of the diameter of said circular cam means and a stopping rod means; said cam means being divided into two peripheral said walls by side long hole and serving as a cam; said stopping rod means composing of a rigid rod held pivotally and movably on by a guide member to said metallic frame having a knob at one end, a stopper at the other end, and between said stopper and the guide member a coil spending into which said rigid rod is inserted being provided to energize said rigid rod outwardly;

a front end lattice and a rear end lattice whose upper parts are respectively fixed to the end portions of the front and the rear and whose lower parts are fixed to the side plates and are detachable therefrom; and a bottom plate having a downwardly turned flange secured to each of two opposite edges and which is slidably inserted in the bottom grooves of the side plates with said flanges between said stop pieces and the interior surface of the side plates so that said side plates are substantially blocked from pivoting beyond said vertical position when folded open and said bottom plate is inserted.

* * * * *